H. C. BOHACK.
ATTACHING DEVICE FOR ANTISKID WHEEL CHAINS.
APPLICATION FILED JAN. 25, 1917.
1,232,760.
Patented July 10, 1917.
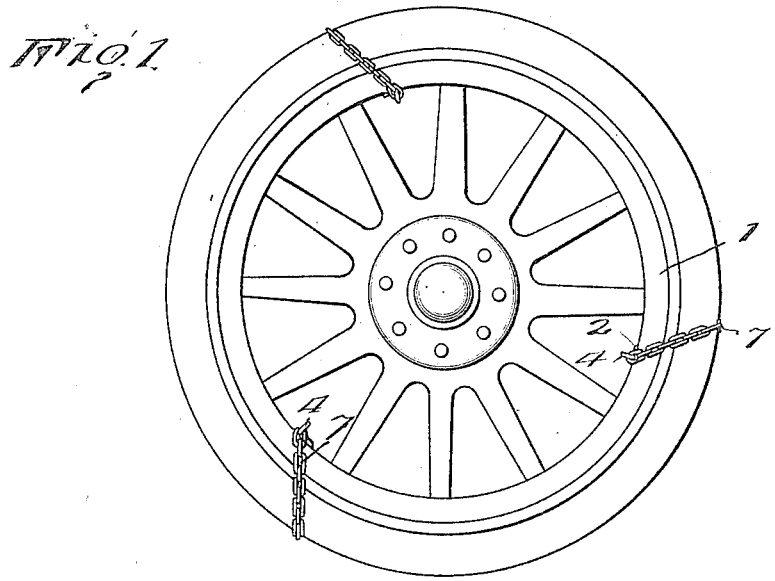
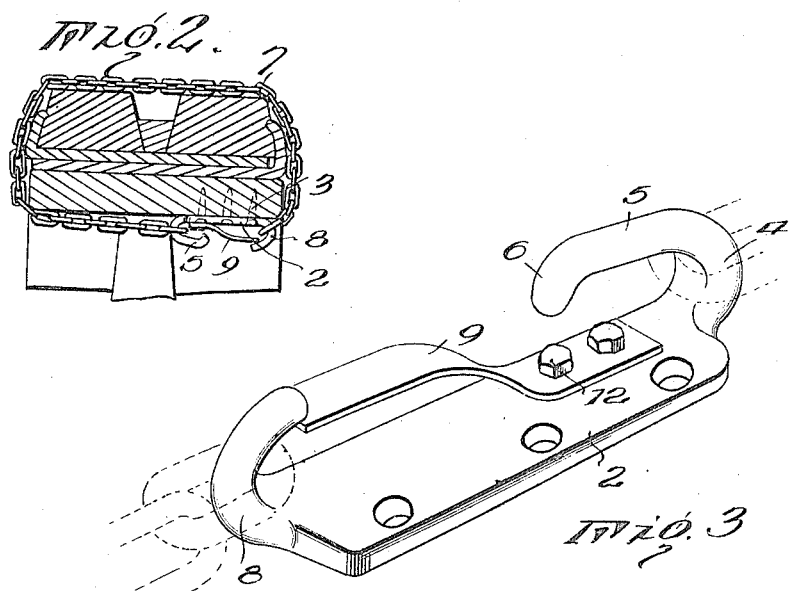
Inventor
H. C. Bohack
By
[signature], Attorneys

UNITED STATES PATENT OFFICE.

HENRY C. BOHACK, OF BROOKLYN, NEW YORK.

ATTACHING DEVICE FOR ANTISKID WHEEL-CHAINS.

1,232,760.　　　Specification of Letters Patent.　　Patented July 10, 1917.

Application filed January 25, 1917. Serial No. 144,505.

*To all whom it may concern:*

Be it known that I, HENRY C. BOHACK, a citizen of the United States, residing at Brooklyn, in the county of Kings and State of New York, have invented certain new and useful Improvements in Attaching Devices for Antiskid Wheel-Chains, of which the following is a specification.

This invention relates to attaching devices for anti-skid chains employed in connection with automobile and similar vehicle wheels, and it is one object of the invention to provide a device of this class which may be readily secured to any automobile wheel and which will permit of the quick and convenient application to and removal from the said wheel of the anti-skid chains.

It is another aim of the invention to provide an attaching device for the purpose stated which will be adapted to securely hold the anti-skid chains upon the wheel without the said chains imposing any strain upon the spokes of the wheel.

In the drawings:

Figure 1 is a side elevation of an automobile wheel equipped with the attaching devices embodying the present invention;

Fig. 2 is a vertical transverse sectional view through the rim of the wheel illustrating the device in elevation;

Fig. 3 is a perspective view of the device detached from the wheel;

Fig. 4 is a detail longitudinal sectional view through a portion of the attaching device.

In the drawings, the rim of the wheel is indicated in general by the numeral 1 and the attaching device embodying the present invention includes an attaching plate 2 which is disposed against the inner side of the said rim 1 and secured in place by means of screws or bolts, indicated by the numeral 3, these fastening elements being of any suitable number and being preferably arranged in a series parallel to one edge of the said plate. It is also preferable that the device as a whole be secured to the rim in such position that it will lie outwardly of the vertical plane occupied by the spokes of the wheel although it may be otherwise attached to the rim if desired.

At one end the attaching plate 2 is formed with an integral hook which extends upwardly from the plate, as indicated by the numeral 4 and thence inwardly in spaced relation to the plate, as indicated at 5, the end of the hook being extended inwardly and downwardly a short distance, as at 6, so as to form the bill of the hook designed to prevent accidental disengagement of the anti-skid chain from the said hook, it being understood that this chain, which is indicated in the drawings by the numeral 7, is designed to have one of its terminal links engaged with the said hook 5. At its other end the plate 2 is formed with a hook 8 which extends outwardly and upwardly from the said end of the plate and thence inwardly in spaced relation to the upper side of the plate, its end terminating above the said plate adjacent the end from which the hook as a whole extends. The hook 8 is shorter than the hook 5 and it will be observed by reference to the drawings that after the chain has been engaged at one end with the hook 5 and has been passed about the rim and tire of the wheel, its other end is to be connected to the device by engaging the corresponding terminal link with the hook 8. In order that the end of the chain may be prevented from accidental disengagement from the said hook 8 a leaf spring 9 is secured upon the upper face of the plate 2 and at its free end bears against the under side of the bill of the hook 8. The leaf spring includes an attaching portion which is formed with openings 10 which register with openings 11 formed in the attaching plate 2 and bolts 12 are fitted through the openings 10 and threaded into the openings 11, it being understood that these bolts may be removed for the purpose of removing the spring 9 in event the same should become broken and it should be desired to substitute a new spring therefor. From its attached end the spring is bowed to extend upwardly and thence approximately parallel to the said plate 2, the attached end of the spring being located substantially beneath the hook 5 and the free end of the spring engaging, as before stated, with the under side of the bill of the hook 8.

Having thus described the invention, what is claimed as new is:

1. A device for the purpose set forth comprising a flat attaching plate adapted along one edge to be secured to the inner circumference of a rim, a hook located at one end of the plate and extending from said end toward the center of the plate, a hook located at the other end of the plate and having its bill presented toward the first-mentioned hook, and a leaf spring having one end rigidly secured to the plate adjacent the first-mentioned hook and its free end engaging under the bill of the second-mentioned hook.

2. A device of the class described comprising an attaching plate, a hook having its bill curved from one end of the plate and extending toward the center of the same with its terminal portion turned toward the plate at a point between the ends of the plate, the space between the said terminal portion of the hook and the surface of the plate being open, a second hook curved from the opposite end of the plate with its terminal approximately in the plane of said end and presented away from the plate and toward the first-mentioned hook, and a leaf spring carried by the plate and having its terminal bearing against the terminal of the second-mentioned hook.

In testimony whereof I affix my signature.

HENRY C. BOHACK.